J. H. Wood,
Artificial Teeth.
No. 102,193.      Patented Apr. 19, 1870.
Fig. 1.
Fig. 2.
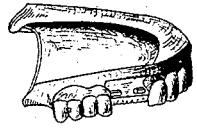
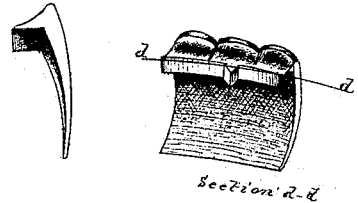
Section a-a
Fig. 3.
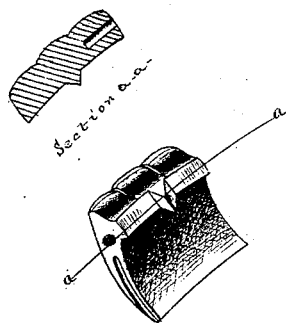
Section a-a
Witnesses
E. R. Brown.
C. C. Theaker
Inventor
J. H. Wood,
by J. C. Theaker
atty

United States Patent Office.

JEHU H. WOOD, OF LEBANON, OHIO.

Letters Patent No. 102,193, dated April 19, 1870.

IMPROVEMENT IN ARTIFICIAL TEETH.

The Schedule referred to in these Letters Patent and making part of the same.

To all whom it may concern:

Be it known that I, JEHU H. WOOD, of Lebanon, in the county of Warren and State of Ohio, have invented certain new and useful Improvements in Artificial Teeth; and I do hereby declare that the following is a full, clear, and exact description thereof, sufficient to enable those skilled in the art to which my invention appertains to make and use the same, reference being had to the accompanying drawings making part of this specification, in which—

Figure 1 represents a set of teeth with one of the blocks removed.

Figures 2 and 3 represent blocks formed with dovetails and depressions, hereinafter described.

The nature of my invention consists in constructing artificial teeth, or blocks of teeth, with double dovetailed depressions at the ends, extending from near the outer surface entirely back to and including the inner surface, and inclining or deepening both toward the center of the outer surface and toward the cutting-edges, so that, when attached to aluminum plates, they are securely clamped by the metal.

The teeth are made either single or in sections or "blocks."

Instead of being notched for rivets, as in those used for rubber work, the porcelain extends out as far as the rivets would extend, forming an even surface.

The porcelain is raised in the center of each block or the center of each tooth, forming a slight bead.

The ends of the blocks or the sides of each tooth, when single teeth are used, are made slightly smaller at a short distance from the base than they are directly at the base, and have formed on them what I call double dovetailed depressions, as shown in fig. 2, so that, when the blocks are in position on the plate, the portion of the metal that is between the ends of the blocks forms a double dovetail or a dovetail inclining inwardly toward the centers of the blocks, and also toward the cutting-edges of the teeth.

The ends of the blocks may also have holes in them, as shown in fig. 3, so that the metal will assume the form of rivets, as shown in fig. 1.

The teeth are arranged on a wax plate, as is usual for rubber work, with small spaces left between them to allow for shrinkage of the metal.

They are then placed on a "model" or "cast" and an impression of them is taken in a flask, which is made in sections and secured together by lugs and keys, or in any other suitable manner.

When the plaster impression has become sufficiently hard, the wax is melted off, and the aluminum poured in.

The metal runs over the body of the blocks, filling the depressions and clamping the blocks securely, the bead in the center of each block or tooth separating the metal, so as to prevent too great contraction of the metal on the teeth, and the metal forming so thin that it will bend as it contracts, instead of crushing or breaking the teeth.

What I claim as new, and desire to secure by Letters Patent, is—

Artificial teeth or blocks of teeth formed with double dovetailed depressions at the ends, extending from near the outer surface entirely back to and including the inner surface, and inclining or deepening both toward the center of the outer surface and toward the cutting-edges, so that the metal runs between the blocks from near the outer surface entirely back to the inner surface, extending from one end of each block around the inner surface to the other end, as shown and described.

J. H. WOOD.

Witnesses:
E. R. BROWN,
C. C. THEAKER.